United States Patent [19]

Crompton et al.

[11] 4,017,418

[45] Apr. 12, 1977

[54] PROCESS FOR MAKING COLLOIDAL SOLS OF ANTIMONY PENTOXIDE IN POLAR ORGANIC SOLVENTS

[75] Inventors: Charles Edward Crompton, Arlington Heights, Ill.; Abdulla M. Z. Kazi, Euclid, Ohio

[73] Assignee: Chemetron Corporation, Chicago, Ill.

[22] Filed: Aug. 18, 1975

[21] Appl. No.: 605,606

[52] U.S. Cl. .......................... 252/309; 106/15 FP; 252/8.1; 423/617
[51] Int. Cl.$^2$ .......................................... B01J 13/00
[58] Field of Search ............... 106/15 FP; 252/309, 252/8.1; 423/617

[56] References Cited
UNITED STATES PATENTS

| | | | |
|---|---|---|---|
| 3,657,179 | 4/1972 | Yates | 106/15 FP |
| 3,676,477 | 7/1972 | Chay et al. | 252/8.1 |
| 3,860,523 | 1/1975 | Petrow et al. | 252/8.1 |

*Primary Examiner*—Lorenzo B. Hayes
*Attorney, Agent, or Firm*—N. M. Esser

[57] ABSTRACT

A colloidal dispersion of hydrous antimony pentoxide particles is made by a process which comprises introducing particles of antimony trioxide into a polar organic solvent selected from the group consisting of formamide, methylformamide, dimethyl formamide, acetamide, methylacetamide, dimethylacetamide, dimethyl sulfoxide, formic acid, tetramethyl urea, methanol and ethanol, and contacting said particles with aqueous hydrogen peroxide in the presence of an aliphatic alpha-hydroxy carboxylic acid and a halogen acid selected from the group consisting of hydrogen chloride, hydrogen bromide, and hydrogen iodide at a temperature of from about 0° C to about the decomposition temperature of the reaction mixture for a length of time sufficient to convert at least a portion of the antimony particles to colloidal particles of hydrous antimony pentoxide.

6 Claims, No Drawings

PROCESS FOR MAKING COLLOIDAL SOLS OF ANTIMONY PENTOXIDE IN POLAR ORGANIC SOLVENTS

BACKGROUND OF THE INVENTION

The role of antimony compositions in the flameproofing of various polymers has been known for many years. One problem associated with many of the prior art antimony compositions used in flameproofing systems is the delustering of fibrous polymers. This problem may be overcome by providing an antimony composition of sufficiently small particle size, significantly less than one micron, so that the antimony particles do not scatter light and thus do not deluster the treated polymer.

Another difficulty associated with the use of an antimony composition in flameproofing polymer lies in the incorporation of the antimony compositions in the polymer. It is desirable to mix the antimony composition with a solution of the polymer in a polar organic spinning or casting solvent prior to final product fabrication. Many prior art compositions of antimony are neither soluble nor readily dispersible in the polar organic solvents commonly used in polymer formulations.

Several methods for preparing colloidal dispersions of antimony pentoxide for use as flameproofing agents for plastics, fibers, elastomers and other polymeric compositions are known in the art. For example, U.S. Pat. No. 3,860,523 teaches a method for forming colloidal antimony pentoxide by deionizing potassium antimonate with a cation exchange resin. Another method for forming sols of antimony pentoxide is shown by U.S. Pat. No. 3,657,179 which teaches the use of antimony trichloride and nitric acid to form a dispersion in a polar organic solvent, and stabilization of the dispersion with an alpha-hydroxy carboxylic acid. The dispersion taught by the 3,657,179 patent contain from 0,01% to 5% water by weight.

The formation of pentavalent antimony compositions by the oxidation of trivalent antimony compositions with hydrogen peroxide is also known in the art. U.S. Pat. No. 3,836,557 shows a method for preparing water soluble salts of pentavalent antimony glycol esters by reacting antimony trioxide with hydrogen peroxide in ethylene glycol under vacuum to remove the water of reaction. U.S. Pat. No. 3,676,447 teaches the formation of pentavalent antimony esters by reacting antimony trioxide with hydrogen peroxide in a polyhydroxy alcohol with distillation to remove the water of reaction.

Many of the foregoing methods require expensive procedures for formulating compositions which can be employed effectively in relatively few polymer systems.

It is therefore an object of this invention to provide a stable dispersion of hydrous antimony pentoxide, and a process for making said dispersion.

Another object of this invention is to provide hydrous antimony pentoxide sols which can be employed as flame retardant agents in natural and synthetic fibers and other polymeric materials, and a process for making said sols.

A further object of this invention is to provide an economical process for making hydrous antimony pentoxide sols from commercial grades of antimony trioxide.

Other objects of this invention will become readily apparent from the following description of the invention.

SUMMARY OF THE INVENTION

The objects of this invention may be accomplished by a method which comproses introducing particles of antimony trioxide into a polar organic solvent selected from the group consisting of formamide, methyl formamide, dimethyl formamide, acetamide, methylacetamide, dimethylacetamide, dimethylsulfoxide, formic acid, tetramethyl urea, methanol and ethanol, and contacting said particles with aqueous hydrogen peroxide, in the presence of an aliphatic alpha-hydroxy carboxylic acid, and a halogen acid selected from the group consisting of hydrogen chloride, hydrogen bromide, and hydrogen iodide, at a temperature of from about 0° C to about the decomposition temperature of the reaction mixture for a length of time sufficient to convert at least a portion of the antimony particles to colloidal particles of hydrous antimony pentoxide.

DESCRIPTION OF THE PREFERRED EMBODIMENTS

Any form of antimony trioxide may be used in the practice of this invention. Preferably, the antimony trioxide will have the senarmontite structure such as the commercially available antimony trioxide which is sold by Chemetron Corporation under the trademark. Fire-Shield High-Tint antimony trioxide. Such commercially available antimony trioxide is useful even though it is much less reactive than freshly precipitated antimony oxide or hydrated antimony oxide and is preferable in the practice of this invention because of its lower cost.

The colloidal sols are formed in a polar organic solvent dispersion medium which contains a quantity of water, usually from about 5% to about 10% water by weight. The polar organic solvents that are useful in the practice of this invention are formamide, methyl formamide, dimethylformamide, acetamide, methylacetamide, dimethylacetamide, dimethylsulfoxide, formic acid, tetramethyl urea, methanol, ethanol, and the like.

The halogen acids that are useful in the practice of this invention are hydrogen chloride, hydrogen bromide, and hydrogen iodide. The halogen acid is preferably added to the reaction mixture as an aqueous solution, for convenience, although gaseous hydrogen halide may be introduced into the reaction mixture if desired. Most preferably, the halogen acid is hydrogen chloride and is introduced into the reaction mixture as an aqueous solution containing 37% hydrogen chloride, by weight.

The concentration of the aqueous solution of hydrogen peroxide which may be employed in the practice of this invention is not critical. The hydrogen peroxide which is preferable in the practice of this invention, because of its lower cost, is a commercially available aqueous solution containing 35% hydrogen peroxide, by weight. If a colloidal dispersion containing a concentration of water of less than about 10%, by weight, is desired, it is preferable to introduce the hydroben peroxide as an aqueous solution containing 70% hydrogen peroxide, by weight. The hydrogen peroxide is preferably used in a 2:1 molar ratio of hydrogen peroxide to antimony trioxide. One mole of hydrogen peroxide is thus present for each mole of trivalent antimony.

The hydrogen peroxide reacts which the antimony trioxide according to the following equation:

$$Sb_2O_3 + 2 H_2O_2 \rightarrow Sb_2O_5 + 2 H_2O$$

The particles of hydrous antimony pentoxide in the dispersion of this invention may exist in many different hydrated forms, the exact nature of which is not fully known. One possible hydrated form is $Sb_4O_6(OH)_8$. Such a structure would have a tetrahedral configuration with a pentavalent antimony atom located at each apex of the tetrahedron. Two hydroxyl groups would be attached to each antimony atom which, in turn, would be bonded to each of the remaining three antimony atoms by Sb-O-Sb linkages. Another possible form of the hydrated antimony pentoxide is $Sb(OH)_5$ in which five hydroxyl groups are bonded to any given pentavalent antimony atom. It is contemplated that many solvated forms of antimony pentoxide may exist in the colloidal dispersions of this invention, all of which are included in the term hydrous antimony pentoxide. The concentration of antimony, as antimony metal, in the sols produced by this invention is usually from about 0.01% to about 10% of the total weight of the dispersion. Concentrations above 10% may be obtained in some polar organic solvents since the practical upper limit on the concentration of antimony in the product sols is the concentration of antimony at which gel formation begins to occur. Such concentration will vary, depending upon the physical and chemical properties of each solvent that is employed as a dispersion medium.

The process of this invention may be accomplished by dispersing particles of antimony trioxide in a polar organic solvent and contacting the particles with hydrogen peroxide in the presence of an aliphatic alpha-hydroxy carboxylic acid, a halogen acid, and water. The process may be performed at any temperature from about 0° C to the decomposition temperature of the reaction mixture, and preferably from about 50° C to about 105° C. The colloidal sol which results from the contacting of the antimony trioxide particles with the hydrogen peroxide, as discussed,, is a stable colloidal dispersion of antimony pentoxide particles having an average size of from about 50 A to about 200 A.

When the antimony trioxide particles are contacted with hydrogen peroxide the dispersion initially consists essentially of a polar organic solvent, hydrogen peroxide, an aliphatic alpha-hydroxy carboxylic acid, a halogen acid and water. a large quantity of non-colloidal antimony trioxide particles is usually suspended in the dispersion medium. After the antimony trioxide particles have been contacted with hydrogen peroxide for a finite period of time, non-colloidal antimony trioxide is removed from the suspended state and converted into dispersed colloidal particles of hydrous antimony pentoxide. It is apparent that the initial dispersion medium contains a relatively high concentration of hydrogen peroxide and water, and no antimony, disregarding the non-colloidal particles of antimony trioxide which are merely suspended in the dispersion medium. As the reaction proceeds, the concentrations of hydrogen peroxide and water in the dispersion medium continuously decrease while the concentration of antimony in the dispersion medium continuously increases. The final dispersion will usually contain approximately 10% water, by weight.

An aliphatic alpha-hydroxy carboxylic acid is employed as a stabilizer in the practice of this invention. The carboxylic acid is usually present at a molar ratio of stabilizer to antimony of from about 0.01:1 to about 4.0:1, preferably from about 0.1:1 to about 2.0:1. Increasing amounts of stabilizer cause corresponding decreasing particle sizes in the product sols until the amount of stabilizer reaches a molar ratio of stabilizer to antimony of about 4:1. In most reaction systems stabilizer concentrations above such a level are apparently ineffective to further reduce the particle size in the product sol below the particle size obtained with the 4:1 ratio.

The order of addition of the five components of the colloidal dispersion of this invention has no effect upon the dispersion produced if the introduction of all of the components into the reaction medium is accomplished within a reasonable length of time. Thus, the antimony component, hydrogen peroxide solution, stabilizer, halogen acid and water may be combined in any sequence within a short period of time, such as one minute, and still produce equivalent dispersions of hydrous antimony pentoxide particles.

Any water-soluble aliphatic alpha-hydroxy carboxylic acid is operable as a stabilizer in the practice of this invention. Aliphatic alpha-hydroxy carboxylic acids having from two to six carbon atoms are especially useful in the practice of this invention. Examples of such alpha-hydroxy carboxylic acids include tartaric acid, oxalic acid, citric acid, malic acid, gluconic acid and the like.

As stated, the halogen acid can be hydrogen chloride, hydrogen bromide, or hydrogen iodide. Some halogen acid must be present to form the sols of this invention in the polar organic solvents other than the polyols. The molar ratio of the halogen acid to antimony is usually from about 0.01:1 to about 2:1, however, a molar ratio of halogen acid to antimony of less than about 0.25:1 does not usually produce commercially desirable products. When the alpha-hydroxy acid is used as a stabilizer at a preferable molar ratio of stabilizer to antimony of from about 0.1:1 to about 2.0:1, the preferable molar ratio of halogen acid to antimony is from about 0.25:1 to about 1:1, and most preferably about 0.5:1.

The process of this invention is accomplished in the presence of water which is usually present at a concentration of from about 5% to about 10% percent of the total weight of the dispersion. The water is almost totally due to the hydrogen peroxide solution which is usually a 35% solution of hydrogen peroxide in water, by weight. When a 70% solution of hydrogen peroxide is employed, the concentration of water in the product sol is reduced essentially in half.

It is apparent from all of the foregoing that the process of the instant invention is distinquishable from the process of U.S. Pat. No. 3,657,179 in many respects. The process of said patent comprises four distinct, sequential steps, (1) contacting antimony trichloride with nitric acid in water at a temperature of below 100° C. to form an oxidation mixture, (2) adding formaldehyde to the oxidation mixture to form a dispersion of pentavalent antimony hydroxide, (3) adding from 0.1 to less than 1 mole of alpha-hydroxy carboxylic acid of from 2 to 6 carbon atoms per mole of antimony to stabilize the pentavalent antimony hydroxide and (4) adding a polar organic solvent to the stabilized dispersion. The resulting dispersions are recited to contain from 0.01 to 5% water, but preferably, less than 2% with substantially anhydrous dispersions most prefered. In the process of the '179 patent, nitric acid is used to oxidize antimony trichloride only in the presence of water. The excess nitric acid is destroyed with formaldehyde and then, after the oxidation of the trivalent antimony to pentavalent antimony has occured, the carboxylic acid and the polar organic solvent are added to the reaction medium. In the process of the instant invention, aqueous hydrogen peroxide is used to oxidize antimony trioxide in the presence of an aliphatic alpha-hydroxy carboxylic acid, a halogen acid, and a polar organic solvent. The product of the instant invention usually contains from about 5% to about 10% water, by weight. Thus, the starting materials, the process, and the final product of the instant invention are different from that of the '179 patent.

Furthermore, one skilled in the art would not perform the oxidation of trivalent antimony to pentavalent antimony with an aqueous solution of 70% nitric acid in the presence of a polar organic solvent. The process of the '179 patent also employs a ratio of carboxylic acid to antimony of less than 1:1. The '179 patent indicates that such a molar ratio greater than 1:1 will form compounds of antimony rather than colloidal dispersions. The process of the instant invention may employ a molar ratio of carboxylic acid to antimony of greater than 1:1 and obtain desirable colloidal dispersions.

The use of antimony oxides to aid the flame resistance of various polymeric compositions is well known. It is preferable to use sub-micron sized particles of antimony oxide so that fibers which are treated with the antimony oxide are not delustered or plastics opacified. The colloidal dispersions of this invention are well suited for use in synthetic fibers and plastics because the average particle size of the sol is from about 50 A to about 200 A and the sols are compatible with many organic solvents which are used for the spinning and film casting of many polymers. Examples of such solvents are methanol ethylene glycol, acetic acid, dimethyl formamide, dimethyl acetamide, formamide, trimethylolpropane and the like. Examples of polymers which may be treated with the products of this invention include polyacrylonitrile, copolymers of acrylonitrile with vinyl and vinylidene halides, polyamides, polyesters, polyurethanes, polyacrylates, polyvinyl chloride, acrylonitrile-butandiene-styrene polymers, and the like.

The following specific examples are for purposes of illustration only and are not intended to limit the scope of the invention. All percentages are by weight, unless otherwise indicated. In all examples the antimony trioxide is Fire-Shield High-Tint antimony trioxide for Chemetron Corporation. The colloidal dispersions made in the following examples may be filtered to remove suspended particles.

EXAMPLE I 30.3 grams (0.23 mole) of malic acid is added to 110 grams (1.5 moles) of dimethyl formamide with stirring. 7.5 grams (0.08 mole) of 37% aqueous hydrogen chloride is added to the stirring mixture, followed by the addition of 22.1 grams (0.08 mole) of antimony trioxide. The stirring mixture is heated to 70°–80° C and 14.7 grams (0.15 mole) of 35% aqueous hydrogen peroxide solution is added to the mixture. The mixture is maintained at 70°–80° C for 15–20 minutes and then cooled. The product is a clear colloidal dispersion of hydrous antimony pentoxide particles having an average particle size of about 70 A. The sol has a molar ratio of carboxylic acid to antimony of 1.5:1 and a molar ratio of hydrogen chloride to antimony of 0.5:1.

EXAMPLE II 3.7 grams (0.04 mole) of an aqueous solution containing 37% hydrogen chloride is added to 111 grams (1.5 mole) of dimethylformamide, while stirring. 30.5 grams (0.23 mole) of malic acid is added to the stirring solution followed by 22.1 grams (0.08 mole) of antimony trioxide. The reaction mixture is heated to 60°–70° C and 17.2 grams (0.15 mole) of 30% aqueous hydrogen solution is added to the stirring mixture. The product is a colloidal dispersion of hydrous antimony pentoxide particles. The sol has a molar ratio of carboxylic acid to antimony of 1.5:1 and a molar ratio of halogen acid to antimony of 0.25:1.

EXAMPLE III 3.7 grams (0.04 mole) of an aqueous solution containing 37% hydrogen chloride is added to 129 grams (1.8 moles) of dimethylformamide, while stirring. 10.2 grams (0.08 mole) of malic acid is added to the stirring solution followed by 22.1 grams (0.08 mole) of antimony trioxide. The reaction mixture is heated to 60°–70° C and 17.2 grams (0.15 moles) of 30% aqueous hydrogen peroxide solution is added to the stirring. 10.2 grams (0.08 mole) of malic acid is added to the stirring solution followed by 22.1 grams (0.08 mole) of antimony trioxide. The reaction mixture is heated to 60°–70° C and 17.2 grams (0.15 moles) of 30% aqueous hydrogen peroxide solution is added to the stirring mixture. The product is a colloidal dispersion of hydrous antimony pentoxide particles. The sol has a molar ratio of carboxylic acid to antimony of 0.5:1 and a molar ratio of halogen acid to antimony of 0.4:1.

EXAMPLES IV 17.2 grams (0.15 mole) of 30% aqueous hydrogen peroxide solution is added to 107.5 grams (1.24 mole) of dimethylacetamide with stirring. 7.5 grams (0.08 mole) of 37% aqueous hydrogen chloride is added to the stirring mixture, followed by the addition of 30.3 grams (0.23 mole) of malic acid. The stirring mixture is heated to 79°–87° C and 22.1 grams (0.08 mole) of antimony trioxide is added to the mixture. The product is a colloidal dispersion of hydrous antimony pentoxide particles having an average size of less than 50 A. The sol has a molar ratio of carboxylic acid to antimony of 1.5:1 and a molar ratio of halogen acid to antimony of 0.5:1.

EXAMPLE V 12.8 grams (0.0758) of a 48% aqueous solution of hydrogen bromide is added to 102.2 grams (1.2 moles) of dimethylacetamide, while stirring. 30.3 grams (0.23 mole) of malic acid is then added to the stirring solution followed by 22.1 grams (0.08 mole) of antimony trioxide. The reaction mixture is heated to 70°–80° C and 17.2 grams (0.15 mole) of 30% aqueous hydrogen peroxide solution is added to the reaction mixture. The product is a clear colloidal dispersion of hydrous antimony pentoxide, having a slightly yellowish tint. The sol has a molar ratio of carboxylic acid to antimony of 1.5:1 and a molar ratio of hydrogen bromide to antimony of 0.5:1.

EXAMPLE VI 7.7 grams (0.05 mole) of a 48% aqueous solution of hydrogen bromide is added to 110 grams (1.4 moles) of dimethyl sulfoxide, while stirring. 30.3 grams (0.23 mole) of malic acid is added to the stirring mixture followed by 22.1 grams (0.15 mole) of antimony trioxide. The reaction mixture is heated to 60°–70° C and 14.7 grams (0.15 mole) of 35% aqueous hydrogen peroxide is added to the reaction mixture. The product is a clear dispersion of hydrous antimony pentoxide. The sol has a molar ratio of halogen acid to antimony 0.3:1 and a molar ratio of carboxylic acid to antimony of 1.5:1.

EXAMPLE VII 7.5 grams (0.08 mole) of a 37% aqueous solution of hydrogen chloride is added to 130 grams (1.7 moles) of dimethyl sulfoxide, followed by 10.2 grams (0.08 mole) of malic acid and 22.1 grams (0.15 mole) of antimony trioxide. The reaction mixture is heated, while stirring, to 60°–72° C and 14.7 grams (0.08 mole) of a 35% aqueous solution of hydrogen peroxide is added to the reaction mixture. The product is a colloidal dispersion of hydrous antimony pentoxide. The sol has a molar ratio of carboxylic acid to antimony of 0.5:1 and a molar ratio of hydrogen chloride to antimony 0.5:1.

While the invention has been described with reference to certain specific embodiments, it will be recognized by those skilled in the art that many variations are possible without departing from the spirit and scope of the invention.

What we claim is:

1. A process for making a colloidal dispersion of hydrous antimony pentoxide particles comprising introducing particles of antimony trioxide into a polar organic solvent selected from the group consisting of formamide, methylformamide, dimethyl formamide, acetamide, methylacetamide, dimethylacetamide, dimethyl sulfoxide, formic acid, tetramethyl urea, methanol and ethanol and contacting said particles with aqueous hydrogen peroxide in the presence of an aliphatic alpha-hydroxy carboxylic acid, and a halogen acid selected from the group consisting of hydrogen chloride and hydrogen bromide, at a temperature of from about 0° C to about the decomposition temperature of the reaction mixture for a length of time sufficient to convert at least a portion of the antimony particles to colloidal particles of hydrous antimony pentoxide.

2. The process of claim 1 wherein the carboxylic acid contains from 2 to 6 carbon atoms.

3. The process of claim 2 wherein the carboxylic acid is selected from the group consisting of tartaric acid, oxalic acid, citric acid, malic acid, and gluconic acid.

4. The process of claim 1 wherein the molar ratio of halogen acid to antimony is from about 0.25:1 to about 1:1.

5. The process of claim 4 wherein the molar ratio of carboxylic acid to antimony is from about 0.1:1 to about 2.0:1.

6. The process of claim 5 wherein the reaction temperature is from about 50° C to about 105° C.

* * * * *